Dec. 8, 1925.  1,564,211
C. W. DAVIS
NIPPLE TAPPING MACHINE
Filed July 25, 1921    7 Sheets-Sheet 2
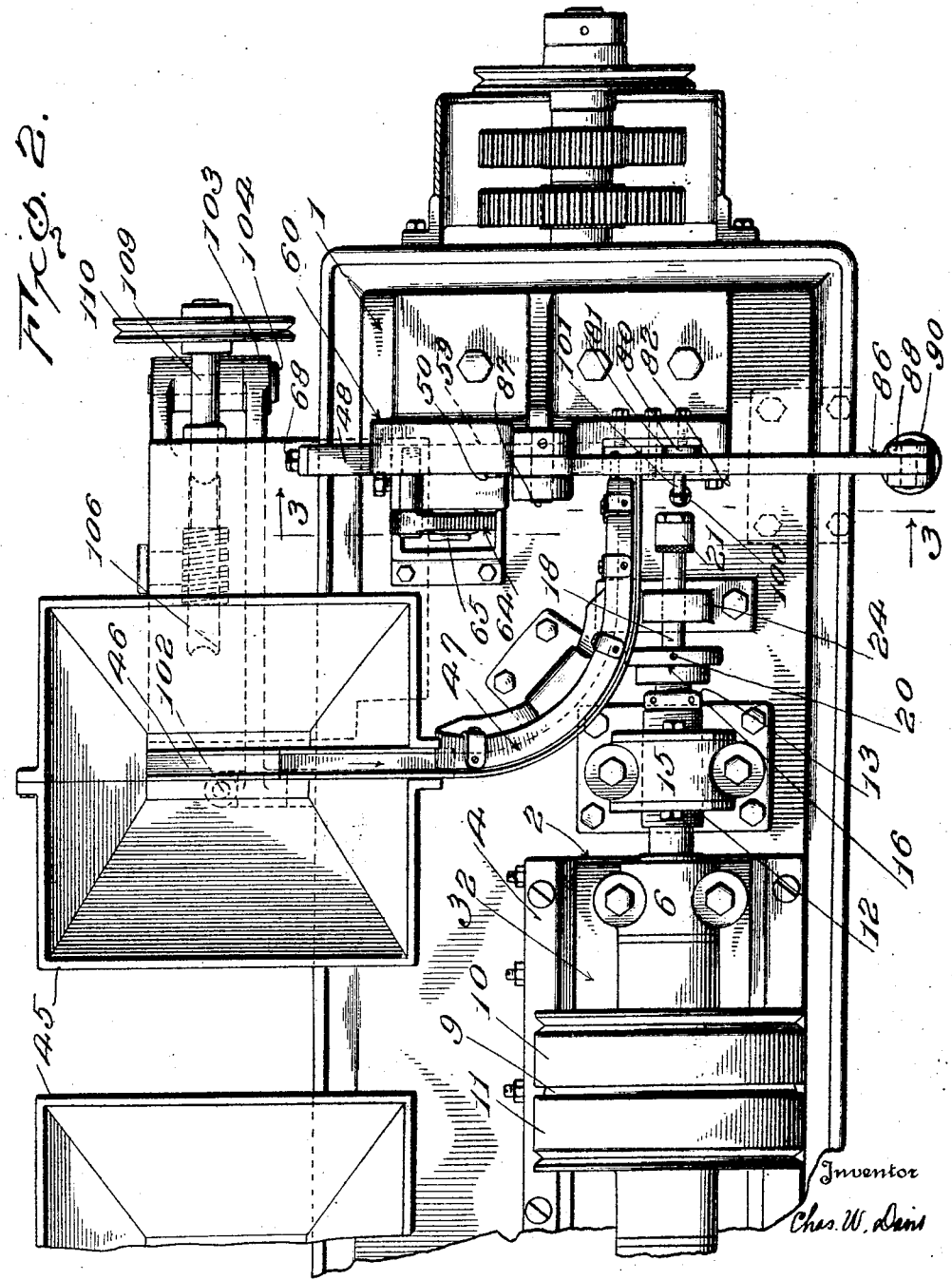
Inventor
Chas. W. Davis
By Sturtevant & Mason
Attorney

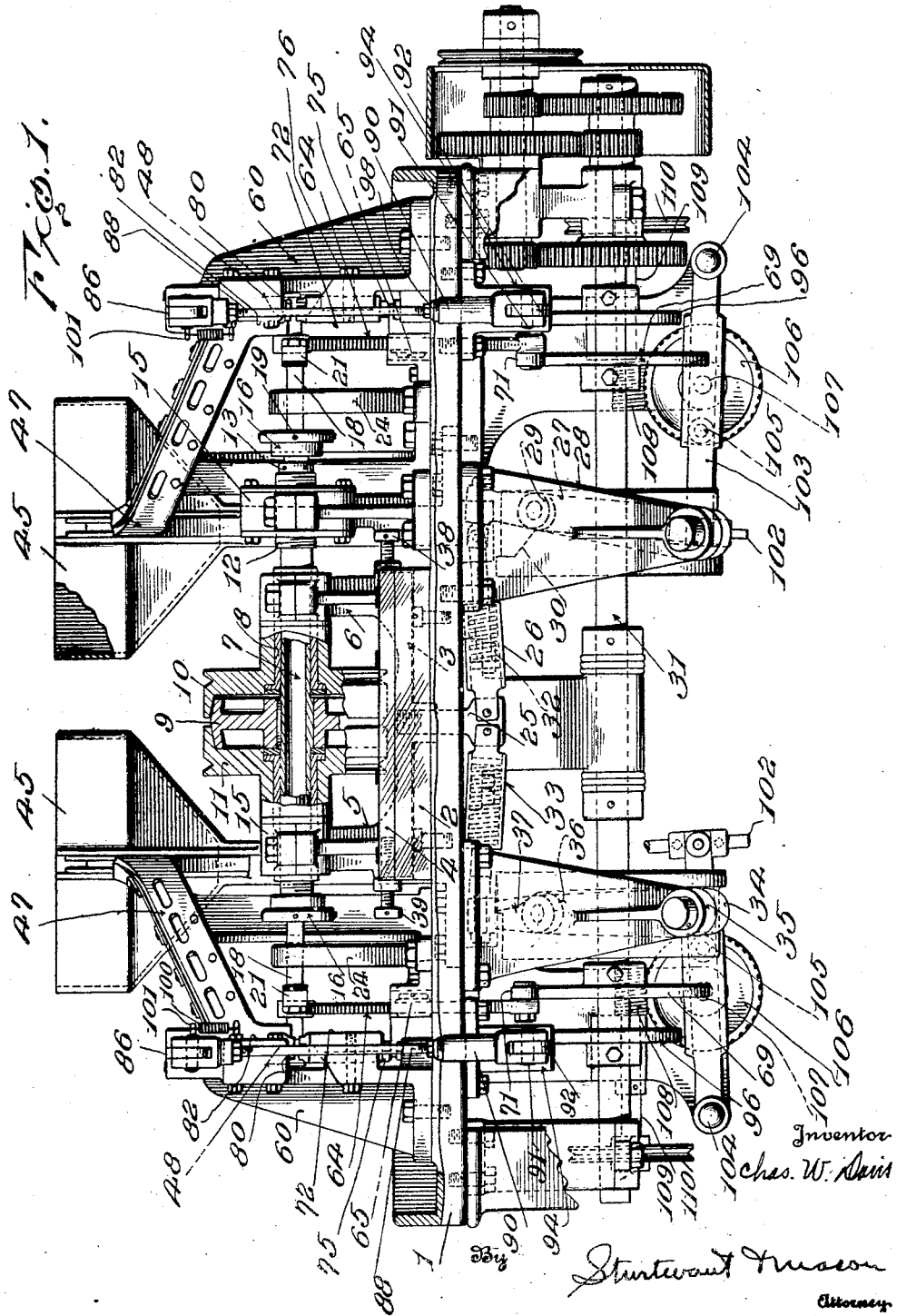

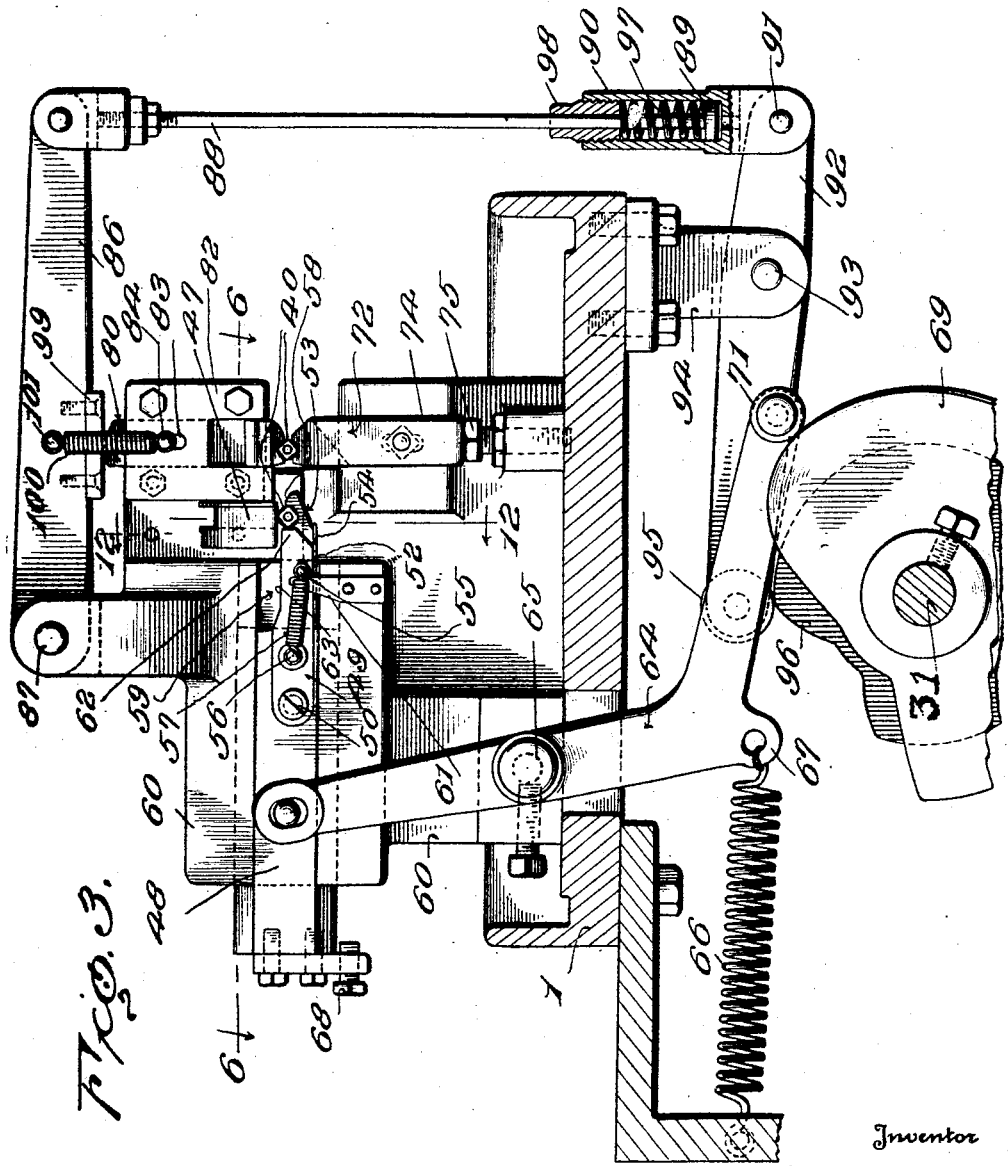

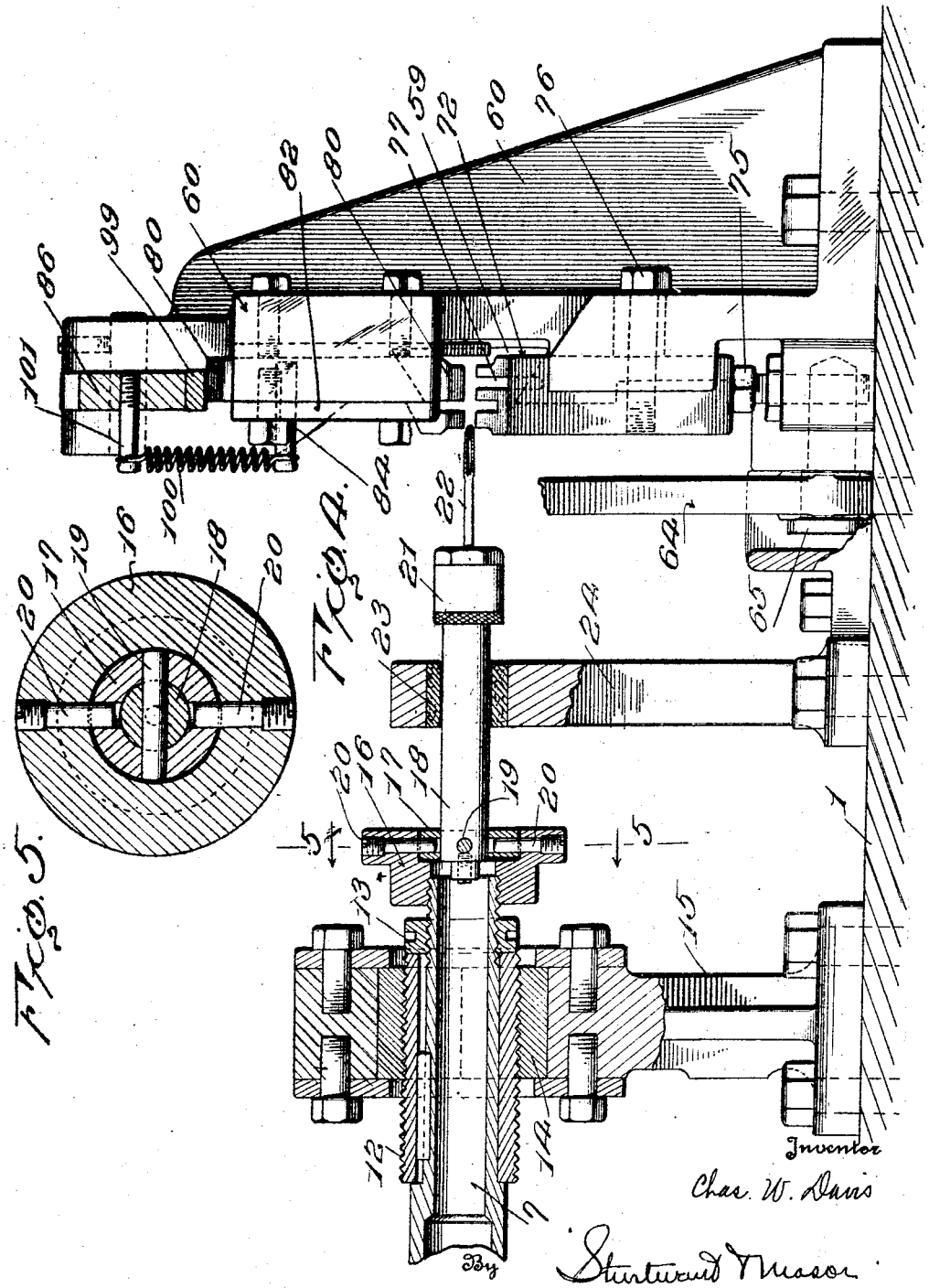

Dec. 8, 1925.
C. W. DAVIS
1,564,211
NIPPLE TAPPING MACHINE
Filed July 25, 1921
7 Sheets-Sheet 5
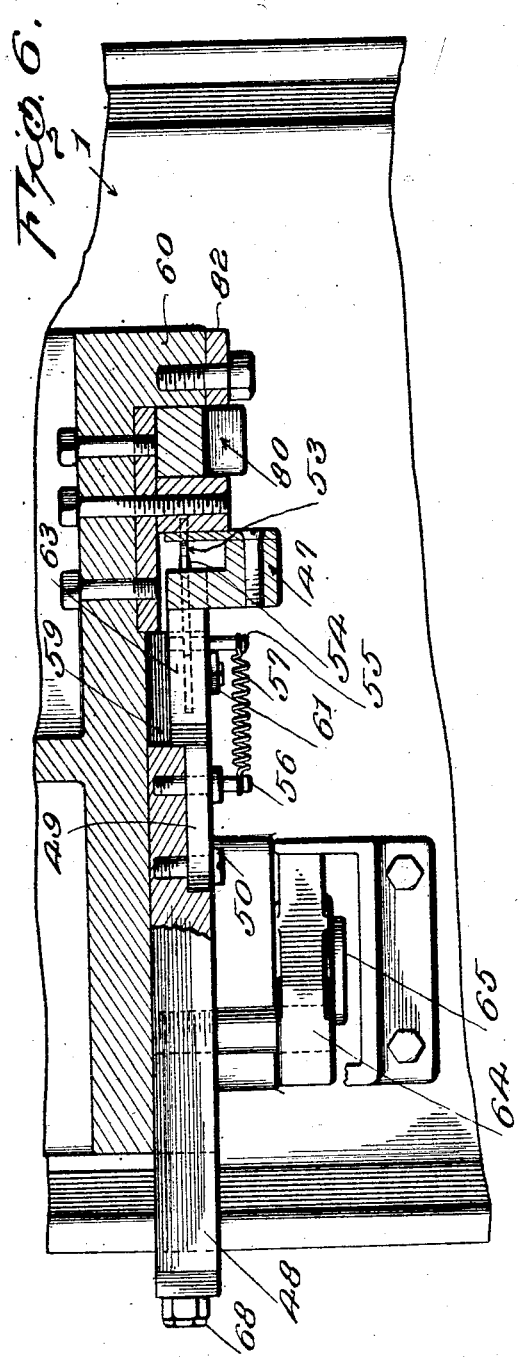
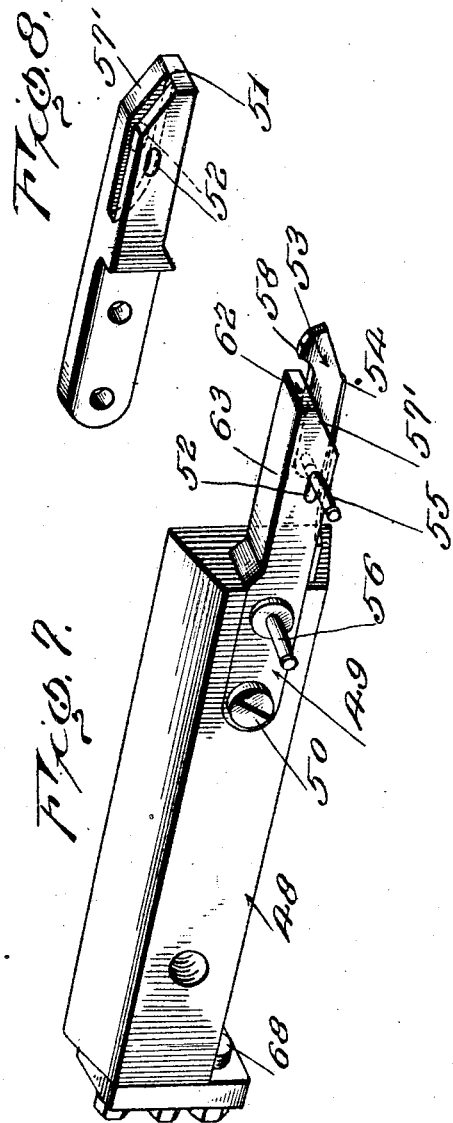
Inventor
Chas. W. Davis
By Sturtevant & Mason
Attorneys

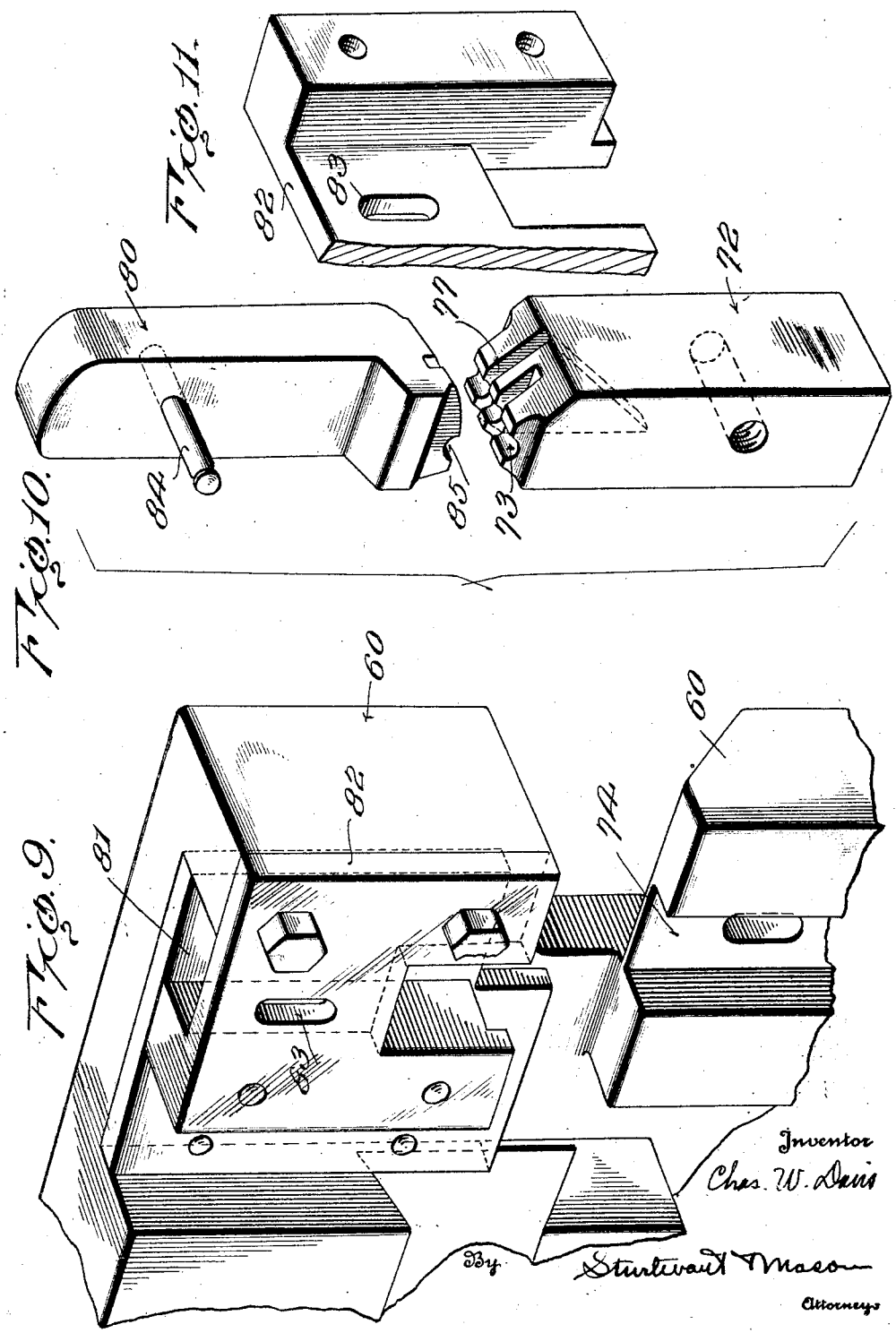

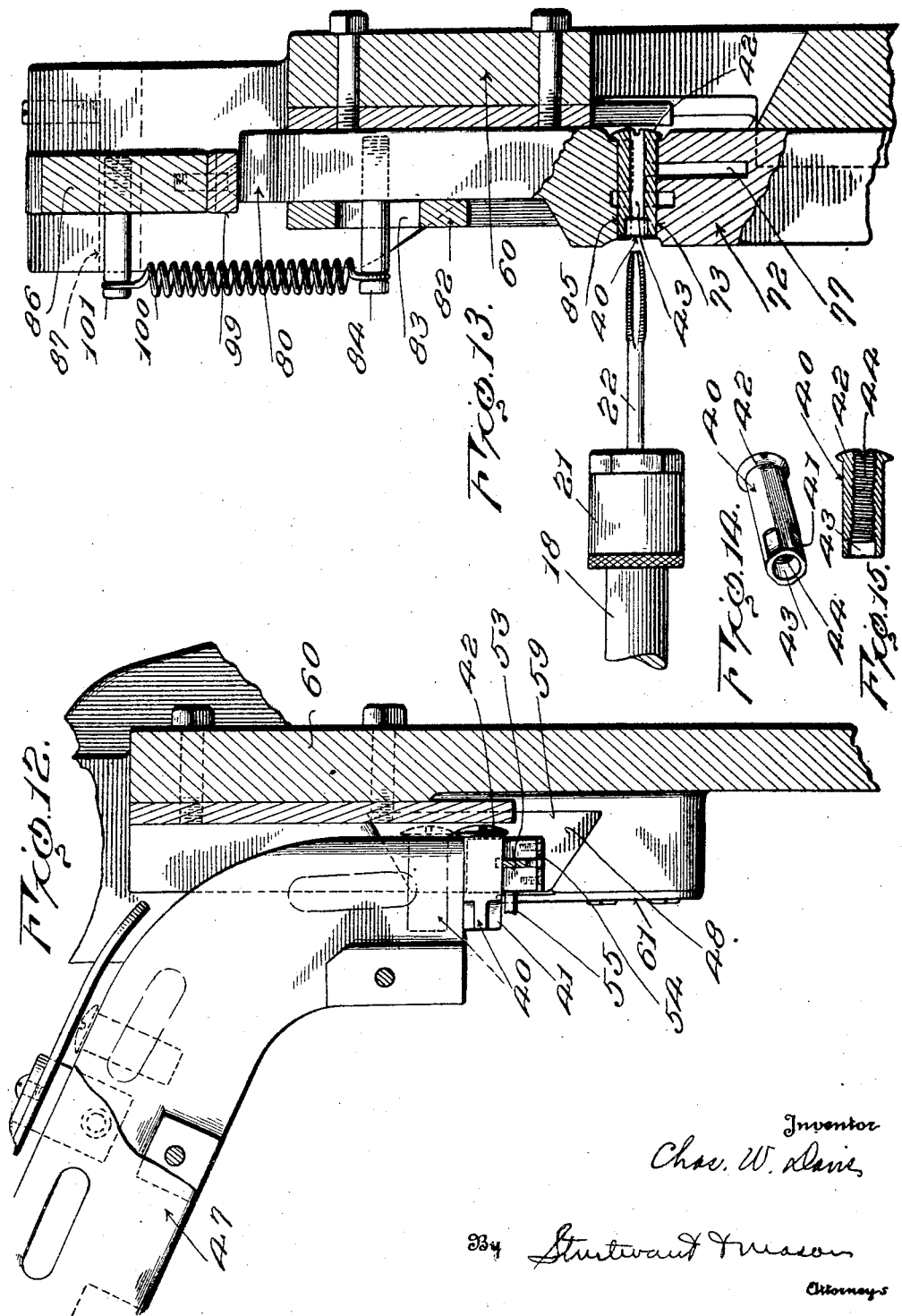

Patented Dec. 8, 1925.

1,564,211

UNITED STATES PATENT OFFICE.

CHARLES W. DAVIS, OF TORRINGTON, CONNECTICUT, ASSIGNOR TO TORRINGTON COMPANY, OF TORRINGTON, CONNECTICUT, A CORPORATION OF CONNECTICUT.

NIPPLE-TAPPING MACHINE.

Application filed July 25, 1921. Serial No. 487,285.

*To all whom it may concern:*

Be it known that I, CHARLES W. DAVIS, a citizen of the United States, residing at Torrington, in the county of Litchfield, State of Connecticut, have invented certain new and useful Improvements in Nipple-Tapping Machines, of which the following is a description, reference being had to the accompanying drawing and to the figures of reference marked thereon.

The invention relates to new and useful improvements in tapping machines, and more particularly to a tapping machine for tapping an article, wherein the opening to be threaded has considerable length, such, for example, as a nipple used in connection with the attachment of a spoke to a wheel.

An object of the invention is to provide a machine of the above type, wherein the tap has a universal connection with its operating shaft, so that it may readily aline itself with the opening which is to be threaded.

A further object of the invention is to provide a machine of the above type with means for supporting the tap between its connection with the operating shaft and the tap proper, so as to aline the tap relative to the opening to be threaded.

A still further object of the invention is to provide a machine of the above type with means for automatically presenting nipples to be threaded to the tap and for rigidly supporting said nipples while they are being tapped.

A still further object of the invention is to provide a machine of the above type, wherein the operating shaft carries a tap at each end thereof and the machine is so operated that when one nipple is being threaded the tap is being retracted from another.

These and other objects will in part be obvious and will in part be hereinafter more fully disclosed.

In the drawings which show by way of illustration one embodiment of the invention—

Figure 1 is a view partly in section and partly in front elevation, showing a machine embodying my invention;

Figure 2 is a top plan view of a portion of the machine;

Figure 3 is a sectional view on the line 3—3 of Figure 2;

Figure 4 is a view partly in vertical section and partly in front elevation on an enlarged scale, showing the nipple holding means at one side of the machine and a portion of the actuating shaft for the tap; also the tap, its connection to the shaft and the support for the tap;

Figure 5 is a sectional view on the line 5—5 of Figure 4;

Figure 6 is a sectional view on the line 6—6 of Figure 3;

Figure 7 is a perspective view of the feed slide for presenting the nipples to the clamping means which holds the nipple while it is being threaded;

Figure 8 is an enlarged bottom perspective view of the supporting arm carried by the feed slide;

Figure 9 is a perspective view of a portion of the machine for supporting the nipple clamping members;

Figure 10 is a perspective view of the nipple clamping members;

Figure 11 is a rear view in perspective partly in section of the upper front plate for holding one of the clamps;

Figure 12 is a sectional view on the line 12—12 of Figure 3;

Figure 13 is a vertical sectional view through the nipple supporting means; also showing the tap about to enter the nipple;

Figure 14 is a perspective view of a nipple adapted to be threaded on the machine;

Figure 15 is a sectional view of the same.

The invention is directed broadly to a machine for tapping articles, wherein the opening to be threaded has considerable length and the article to be tapped is rigidly held while it is being threaded. The tap for threading the article is carried by an actuating shaft which not only rotates, but which is also fed endwise during its rotation causing the tap to cut a thread in the article. The tap is connected with the actuating shaft by a universal joint connection and between the tap proper and the universal joint connection is a support for the tap which operates to aline the tap relative to the opening in the article to be threaded, which permits sufficient movement of the tap so that it will follow the opening and thread the same rather than to cut a new opening or cut the threads deeper on one side of the opening than on the other.

The nipples are fed one at a time automatically to threading position and are firmly gripped and held while they are being threaded.

The machine preferably includes two taps, one at each end of the actuating shaft and two sets of feeding and holding devices for the nipples, so that the shaft when it is moved in one direction cuts the thread in one nipple while the tap at the other end of the shaft is being withdrawn from a tapped nipple. The machine also includes means for reversing automatically the endwise movement of the shaft carrying the tap and this reversing mechanism includes yielding links which are positively actuated by cams for reversing the movement of the actuating shaft.

Referring more in detail to the drawings, the invention is embodied in a machine consisting of a supporting table 1, on which is mounted a block 2, having a guiding recess for a reciprocating carriage 3. Plates 4 secured to the block overlie the edge of the carriage and retain the same on the block, but permit the carriage to move freely endwise. The carriage is provided with spaced brackets 5 and 6. Mounted in said spaced brackets is a shaft 7. Each bearing carries a sleeve 8 and the shaft is mounted in said sleeves and is capable of rotating therein and also of moving endwise in said sleeves. Fixed to the shaft is a double cone pulley 9. Mounted on one of the sleeves at the right-hand end of the carriage is a belt driven friction cone pulley 10. Also mounted on the sleeve at the other end of the carriage is a belt driven friction cone pulley 11. These pulleys 10 and 11 rotate in opposite directions and are adapted to be alternately engaged with the double cone pulley 9 for driving the shaft 7. It will be obvious that when one belt pulley is connected to the shaft it will rotate the shaft in one direction and when the other belt pulley is connected to the shaft it will rotate the shaft in the other direction.

Mounted on the shaft 7 is a removable threaded sleeve 12. Said threaded sleeve 12 is keyed to the shaft and is held thereon by a collar 13. This threaded sleeve 12 is adapted to co-operate with a threaded sleeve 14 which is carried by a standard 15 secured to the table 1. Said sleeve 14 is held from rotation and may be readily removed and interchanged with others. The object of changing the sleeves 12 and 14 is to vary the number of threads per inch cut by the tap on the nipple. These sleeves 12 and 14 co-operate in moving the actuating shaft 7 endwise for feeding the tap into the nipple during the threading and for retracting the tap after the nipple has been threaded.

Mounted on the end of the shaft 7 is a supporting head 16. Said supporting head 16 is provided with a recess in its outer face in which is placed a disk 17 of slightly smaller diameter than the diameter of the recess. Said disk 17 is provided with a central opening into which extends a support 18. Said support 18 is also of smaller diameter than the opening in the disk 17. The support 18 is held in the disk 17 by means of a pin 19. The disk 17 is held in the head 16 by means of pins 20—20. The pins 20—20 are in alinement and are arranged at right angles with the pin 19. It will be obvious that the support 18 has a universal connection with the shaft 7 and that said support will be positively rotated by the shaft, but said support may shift so that its longitudinal axis of rotation is slightly at an angle to the axis of rotation of the actuating shaft 7. On the outer end of the support 18 is a clamping head 21 for holding the tap 22. The support intermediate its ends runs in a hardened bearing sleeve 23 carried by the bracket 24. The opening in this bearing sleeve 23 is of sufficient size to permit the support 18 to shift slightly in the manner above described.

It is understood that there is a support 18 at each end of the shaft 7 and that they are similarly connected to the shaft. Common reference numerals have therefore been applied to the common parts at each end of the shaft and further description thereof is not thought necessary. There is only one pair of threaded feed sleeves for the shaft 7.

The means for reversing the movements of the shaft so that the shaft will be fed first in one direction and then in the other after tapping a nipple, first at the right and then at the left of the machine, and so on, forms no part of the present invention, but is shown, described and claimed in a co-pending application of James H. Graham, Serial No. 487,302, filed of even date herewith, and therefore, the reversing mechanism will only be referred to in a very general way.

Depending from the carriage 3 is an arm 25. A yielding link 26 connects the arm 25 with a lever 27. Said lever 27 is pivotally supported by the bracket 28 and carries a roller 29 which co-operates with a cam 30 mounted on the shaft 31. The link 26 is formed in two parts connected by a spring 32, shown in dotted lines in Figure 1. There is a similar yielding link 33 which connects the arm 25 with a lever 34 pivoted to a bracket 35 and carrying a roller 36 which co-operates with a cam 37, also mounted on the shaft 31. These cams 30 and 37 are so shaped that the following action takes place.

When the carriage reaches the extreme movement to the right, as viewed in Figure 1, and the nipple at the right has been threaded, the roller 36 runs up a sharp incline on the cam 37 and moves the carriage so as to cause the belt driven cone pulley 10 to engage the double cone pulley 9 and this will cause the belt driven cone pulley 11 to release the double cone pulley 9 and thus the direction of rotation of the shaft 7 is reversed. When the carriage reaches the other end of its movement, then the yielding link 26 is put under strain through the roller 29 running up a sharp incline on the cam 30 and this shifts the carriage in the opposite direction. The stops 38 and 39 are for the purpose of insuring that the carriage will stop when it reaches the end of the stroke and that the double cone pulley 9 will be released from the pulley which is driving the same.

The means for supporting and feeding the nipples for threading are duplicated at each side of the machine and therefore the parts at one side of the machine only will be described, while similar reference numerals will be placed on like parts on the other side of the machine.

The principal object of the invention is to thread an opening of considerable length. I have shown in the drawings, for example, a nipple which consists of the body portion 40 which is of considerable length relative to its diameter. Said nipple is slabbed at 41 and is provided with a head 42 having a slot therein whereby it may be turned. Said nipple is provided with a central opening 43 extending longitudinally therethrough and it is this opening that it is desired to provide with threads, such as indicated at 44 in Figure 15.

The nipples are placed in a hopper 45 and are raised by means of a lifting slide 46 and directed into a chute 47. The chute 47 conveys the nipples to the feeding-in slide 48. The feeding-in slide 48 is provided with a recess in which is set an arm 49. The arm is secured in the recess by means of a screw 50. Said arm is provided with a slot 51 in its underface and an elongated opening 52. A holding dog 53 slides endwise in the slot 51 and is held in place by means of a spring plate 54. Said dog is provided with a pin 55 which projects through the elongated opening 52. The arm is provided with a pin 56 and a spring 57 connects the arms 55 and 56 and normally pulls the dog inwardly. The end of the arm 49, on its underface, is beveled, as indicated at 57'. The dog 53 is provided with an upwardly projecting shoulder 58. The feed slide 48 is adapted to be reciprocated back and forth in a guide-way 59, see Figure 3. The guide-way is formed in a bracket 60. Mounted on the bracket 60 is an upwardly projecting arm 61 which is adapted to engage the pin 55 when the feed slide is retracted. This will stop the movements of the dog 53 and cause the end 62 of the arm 49 to move away from the projection 58 on the dog 53. This forms an opening or recess of slightly larger diameter than the nipple. This arm 49 reciprocates back and forth directly underneath the discharge end of the chute 47, so that when the slide is retracted a nipple will drop by gravity into the space between the end 62 of the arm 49 and the projection 58. As the slide moves forward the spring 57 will hold the dog 53 back and cause the projection 58 to clamp the nipple against the end 62 of the arm 49. The upper face 63 of the arm 49 is flat and of substantially the same width as the nipples and supports the nipples in the chute until the arm is again retracted.

The feed slide 48 is reciprocated by means of an arm 64. The arm 64 is pivoted at 65 to the bracket 60. Said arm 64 is moved in a direction to carry the feed slide 48 by means of a spring 66 which is secured at one end to a perforated lug 67 carried by the arm 64 and at its other end to the table of the machine. The forward movement of the arm 48 through the action of the spring is limited by means of a stop screw 68 carried by the feed slide 48 and striking the bracket 60. By adjusting this screw the limit of the forward movement of the arm 48 may be adjusted. The lever 64 is moved in the other direction to retract the feed slide by means of a cam 69 mounted on a shaft 31 and engaging a roller 71 at the outer end of the lower part of the lever 64.

The nipples are firmly gripped and supported for threading by means of two clamping members 72 and 80. The lower clamping member 72 is shown in detail in Figures 10 and 13. Said clamping member is provided with a semicircular seat 73, in which the nipple lies and is supported. The bracket 60 is provided with a recess 74, in which the clamping and supporting member 72 is placed. Said clamping and supporting member rests at its lower end on an adjustable bolt 75, see Figure 4 and said clamping member is held locked in adjusted position by means of a clamping bolt 76 passing through a vertical elongated slot in the bracket 60 and threaded in said supporting member 72. By loosening this bolt 76 and adjusting the supporting bolt 75 the support 72 for the nipple may be raised and lowered so as to properly position the nipple in alignment with the tap carried by the actuating shaft. The upper portion of said support 72 is provided with a vertical slot 77 which is adapted to receive the supporting dog 53 as it moves forward carrying the nipple with it. As the slide 48 moves forward the nipple will be positioned directly above the seat 73 while it is still clamped and supported by the holding dog 53. The nipple is clamped in its seat 73 by means of an upper clamping member 80. This upper clamping member 80 slides in a guide-way 81 formed in the bracket 60 and is held in place therein by means of a cover plate 82. Said cover plate 82 has a slot 83 formed therein through which a pin 84 carried by the upper clamping member 80 extends. There is a semi-circular recess 85 in the lower face of the clamping member 80 which is directly above and corresponds with the seat 73 in the support 72.

The upper support 80 is moved downwardly by means of a lever 86. Said lever 86 is pivoted at 87 to the bracket 60 and is moved downwardly by means of a link 88. Said link is provided with a head 89 at its lower end which extends into a sleeve 90 pivoted at 91 to a lever 92 which in turn is pivoted at 93 to a bracket 94 carried by the table 1. The free end of the lever 92 carries a roller 95 which runs on a cam 96 carried by the shaft 31. Located within the sleeve 90 is a spring 97 which bears against the head 89 at its lower end and against a cap 98 at its upper end. The lever 86 is provided with a hardened plate 99 which bears on the upper end of the clamping support 80. A spring 100 is connected to the pin 84 and to a pin 101 attached to the lever 86.

From the above it will be apparent that when the lever 86 is pulled down the support 80 will be moved downwardly, will engage the nipple and will force the same down into the seat 73, the supporting dog 53 yielding to permit this downward movement of the nipple and thus the nipple is firmly gripped and held between the clamping members 72 and 80, and any variation in the size of the nipple will not interfere with the proper holding of the same as the adjustment is such on link 88 that when the nipple is gripped the head 89 on the link 88 is moved slightly in the sleeve 90 and the gripping is applied through the compression of the spring 97. The feed slide then retracts for another nipple. When the arm 86 is raised the clamping member 80 is lifted by means of the spring 100.

The slide 46 at each side of the machine for lifting the nipples from the hoppers and directing them into the chutes is raised and lowered by means of a rod 102 which is connected to a lever 103 pivoted at 104. The lever is raised and lowered by a rotating crank pin 105 carried by a disk 106. Said disk is mounted on a shaft 107 carrying a gear which is rotated by a worm gear 108 on a shaft 109 operated by a belt wheel 110. It is understood that these parts at each side of the machine are duplicated and independent of each other, and therefore like reference numerals have been placed thereon.

The operation of the machine is thought to be obvious from the detail description given above. The nipples to be tapped are placed in the hopper and are raised by the reciprocating slide 46 and fed into the chutes. The nipples pass down the chute by gravity and are fed by the chutes to a position to be received by the feed slide 48. As the feed slide 48 moves forward it carries a nipple to tapping position. The nose of the dog supporting the nipple on the feed slide forces the previously tapped nipple out of its seat in the lower clamping member and the feed slide positions the nipple for the clamps to grip the same. The shaft carrying the taps turns first in one direction and then in the other and thus the tap at one side of the machine moves forward to tap a nipple, while the tap at the other side of the machine is being retracted from a threaded nipple. The nipples are rigidly held during tapping and the tap has a universal connection with its actuating shaft, so that it may follow the opening in the nipple and thread the opening uniformly throughout.

It is obvious that minor changes in the details of construction and arrangement of the parts may be made without departing from the spirit of the invention as set forth in the appended claims.

Having thus described my invention, what I claim as new and desire to secure by Letters Patent, is:

1. A tapping machine comprising a tap, means for rotating said tap first in one direction and then in the other, means for feeding said tap, means for connecting the tap to the rotating means therefor so that said tap may have a universal movement relative to its rotating means, and means disposed between the tap and its universal connection with the rotating means for supporting and alining the tap with the opening in the article to be tapped.

2. A tapping machine comprising a tap, means for rotating said tap first in one direction and then in the other, means for feeding said tap, means for connecting the tap to the rotating means therefor so that said tap may have a universal movement relative to its rotating means, means for rigidly supporting the article to be tapped and means disposed between the tap and its universal connection with the rotating means for supporting and alining the tap with the opening in the article to be tapped.

3. A tapping machine comprising a tap, means for rotating said tap first in one direction and then in the other, means for feeding said tap, means for connecting the tap to the rotating means therefor so that said tap may have a universal movement relative to its rotating means, means for rigidly supporting the article to be tapped, means for automatically feeding articles to be tapped to tapping position and means disposed between the tap and its universal connection with the rotating means for supporting and alining the tap with the opening in the article to be tapped.

4. A tapping machine comprising a tap, means for rotating said tap first in one direction and then the other, means for feeding said tap, means for supporting said rotating means whereby the same turns about a horizontal axis, said tap having universal connection with the rotating means, a bracket having a supporting bearing for supporting the tap between the operating end thereof and the universal connection to the rotating means, said supporting means for the tap permitting the tap to rotate about an axis at a slight inclination to the horizontal axis of the rotating means.

5. A tapping machine comprising a tap, means for rotating said tap first in one direction and then the other, means for feeding said tap, means for supporting said rotating means whereby the same turns about a horizontal axis, said tap having universal connection with the rotating means, a bracket having a supporting bearing for supporting the tap between the operating end thereof and the universal connection to the rotating means, said supporting means for the tap permitting the tap to rotate about an axis at a slight inclination to the horizontal axis of the rotating means, and means for rigidly supporting articles to be tapped.

6. A nipple tapping machine comprising a tap, a shaft rotating about a horizontal axis, means for rotating the shaft in one direction and then the other, means for feeding the shaft endwise during rotation, a support carrying said tap and having universal connection with said shaft, means in which said support rotates, said means permitting the tap to rotate about an axis at an inclination to the axis of the shaft, and means for rigidly supporting the nipples whereby the same may be threaded by said tap.

7. A nipple tapping machine including in combination, a horizontally rotating tap, a nipple supporting and clamping member, means for adjusting said clamping member vertically, a co-operating clamping member for rigidly gripping and holding the same while being tapped, yielding means for raising said upper clamping member, and a yieldingly operated lever for forcing said upper clamping member downwardly into engagement with the nipple.

8. A nipple tapping machine including in combination, a horizontally rotating tap, a nipple supporting and clamping member, means for adjusting said clamping member vertically, a co-operating clamping member for rigidly gripping and holding the same while being tapped, yielding means for raising said upper clamping member, a yieldingly operated lever for forcing said upper clamping member downwardly into engagement with the nipple, and means for varying the tension on said yieldingly operated lever.

9. A nipple tapping machine including in combination, a horizontally rotating tap, a nipple supporting and clamping member, means for adjusting said clamping member vertically, a co-operating clamping member for rigidly gripping and holding the same while being tapped, yielding means for raising said upper clamping member, a yieldingly operated lever for forcing said upper clamping member downwardly into engagement with the nipple, said yielding means for operating the lever including a rotating cam, a lever operated thereby, a link connecting the cam operated lever with a lever for actuating the clamping member, said link comprising two members with a spring interposed between said members and the means for varying the tension on said spring.

10. A nipple tapping machine including in combination, a horizontally rotating tap, a nipple supporting and clamping member, means for adjusting said clamping member vertically, a co-operating clamping member for rigidly gripping and holding the same while being tapped, yielding means for raising said upper clamping member, a yieldingly operated lever for forcing said upper clamping member downwardly into engagement with the nipple, means for varying the tension on said yieldingly operated lever, and means for placing the nipples one at a time between said clamping members, said means including a feed slide and a yielding dog for yieldingly clamping the nipple.

In testimony whereof, I affix my signature.

CHAS. W. DAVIS.